United States Patent [19]
Peck

[11] Patent Number: 6,065,919
[45] Date of Patent: May 23, 2000

[54] SELF-TAPPING SCREW WITH AN IMPROVED THREAD DESIGN

[76] Inventor: Philip D. Peck, 1524 Meadow Trail, South Bend, Ind. 46614

[21] Appl. No.: 09/371,186

[22] Filed: Aug. 9, 1999

Related U.S. Application Data

[63] Continuation-in-part of application No. 09/252,577, Feb. 18, 1999, Pat. No. 6,015,252.

[51] Int. Cl.[7] .............................. F16B 25/00; F16B 35/04
[52] U.S. Cl. ........................ 411/412; 411/387.1; 411/418
[58] Field of Search ................................. 411/386, 394, 411/399, 387.1, 387.2, 412, 413, 418

[56] References Cited

U.S. PATENT DOCUMENTS

| | | | |
|---|---|---|---|
| 3,541,918 | 11/1970 | Johnson | 411/412 |
| 4,329,099 | 5/1982 | Shimizu et al. | 411/412 |
| 5,294,227 | 3/1994 | Forster et al. | 411/386 |
| 5,779,417 | 7/1998 | Barth et al. | 411/412 |
| 6,015,252 | 1/2000 | Peck | 411/412 X |

*Primary Examiner*—Neill Wilson
*Attorney, Agent, or Firm*—Donald J. Ersler

[57] ABSTRACT

A self-tapping screw with improved cutting point includes a head, a screw body, a double cutting point, and a washer. A first thread and a second thread are formed on the screw body. The second thread has the same pitch as the first thread and is formed between the first thread. The second thread has a major diameter which is less than the major diameter of the first thread. The first thread starts at substantially a shoulder and continues to a point of the screw body The second thread starts at substantially the shoulder and continues to the point of the screw body. The shoulder is formed on a bottom of the head. A washer preferably metal with rubber vulcanized thereon is placed under the shoulder of the head. The rubber seals the hole created by the self-tapping screw with improved cutting point. A notch may be included to improve the deburring and drilling ability thereof. The major diameter of the second thread may be increased to equal the major diameter of the first thread near the head to facilitate the automated application of the washer.

18 Claims, 4 Drawing Sheets

6,065,919

SELF-TAPPING SCREW WITH AN IMPROVED THREAD DESIGN

CROSS-REFERENCES TO RELATED APPLICATIONS

This is a continuation-in-part application, Ser. No. 09/252,577 filed on Feb. 18, 1999 now U.S. Pat. No. 6,015,252.

BACKGROUND OF THE INVENTION

1. Field of the Invention

The present invention relates generally to screws and more specifically to a self-tapping screw with an improved thread design which facilities automated application and painting of a washer.

2. Discussion of the Prior Art

Some self-tapping screws have a single cutting point that is disposed at a tip of a screw body. The single cutting point allows a user to drill through steel sheet. If a notch is formed in the tip of the screw body, part of the single cutting point will be lost. The notch improves the ability to drill through the steel sheet and deburrs the newly formed hole. An example of a single cutting point screw is found in U.S. Pat. No. 4,329,099 to Shimizu, et al. The cutting point is actually part of the thread which continues to the end of the screw body. The screw has a short second thread which does not continue to the tip. However, the Shimizu, et al. patent does not have a notch; a notch greatly improves the ability to drill through steel sheet. It is also easier to drill through steel with two flutes instead of one. Greater stability is obtained by using two flutes especially when drilling by hand.

Further, automated application of a washer to the self-tapping screw is hindered when there are two sets of threads having different major diameters. The automated application of the washer to the self-tapping screw with two different sets of threads, results in the washer being non-parallel to the shoulder of the self-tapping screw head. The washer must be parallel to facilitate painting thereof.

Accordingly, there is a clearly felt need in the art for a self-tapping screw with an improved thread design which facilitates the application of a washer to the self-tapping screw.

SUMMARY OF THE INVENTION

The primary objective of the present invention is to provide a self-tapping screw with an improved thread design which facilitates the application of a washer to the self-tapping screw.

According to the present invention, a self-tapping screw with improved thread design includes a head, a screw body, a double cutting point, and a washer. A first thread and a second thread are formed on the screw body. The second thread has the same pitch as the first thread and is disposed between the first thread. The second thread has a major diameter which is less than that of the first thread. The first thread continues to the tip of the self-tapping screw and turns to become substantially parallel to the length of the screw body at substantially the tip thereof. The second thread continues to the tip of the self-tapping screw and turns to become substantially parallel to the length of the screw body at substantially the tip thereof. The head is preferably a hex head with a shoulder that is larger than the distance across the points of the hex head. A washer, preferably metal with rubber vulcanized thereon is placed under the shoulder of the head. The metal washer with rubber vulcanized thereon seals the hole created by the self-tapping screw and also retains the washer in place for painting.

A notch may be included to improve the drilling and deburring ability of the self-tapping screw. The notch has an included angle of substantially 90 degrees which is formed at substantially the tip of the screw body. The notch increases the diameter of the initial hole created by the double threaded point and also deburrs the hole in the steel sheet. The drawback to the notch is that it destroys the cutting point of either the first or second thread. The double cutting point improves the drilling ability of the screw when the notch is not used, but it also allows a notch to be added to the end of the screw body, while retaining the cutting point of either the first or second thread.

Finally, to facilitate the automated application of a washer to the self-tapping screw such that the washer is parallel to the shoulder of the self-tapping screw head, the major diameter of the second thread is increased to equal the major diameter of the first thread near the head of the self-tapping screw. The washer must be parallel to the shoulder of the self-tapping screw head to facilitate painting of the washer.

Accordingly, it is an object of the present invention to provide a self-tapping screw with improved cutting point which creates a hole with less force than that of the single cutting point prior art self-tapping screws.

It is a further object of the present invention to provide a self-tapping screw with improved cutting point that has a notch at the point thereof to improve the drilling and deburring ability of the self-tapping screw.

It is yet another object of the present invention to provide a self-tapping screw which has a first and second thread which both continue to the point of the screw body.

It is yet another object of the present invention to provide a self-tapping screw which has a second thread which has a major diameter that is increased to equal the major diameter of the first thread near the head of the screw-tapping screw.

Finally, it is another object of the present invention to provide a self-tapping screw which has a first thread with a greater major diameter than the second thread to decrease the amount of force needed to thread the self-tapping screw with improved cutting point into a material.

These and additional objects, advantages, features and benefits of the present invention will become apparent from the following specification.

DETAILED DESCRIPTION OF THE PREFERRED EMBODIMENTS

Figure 1:
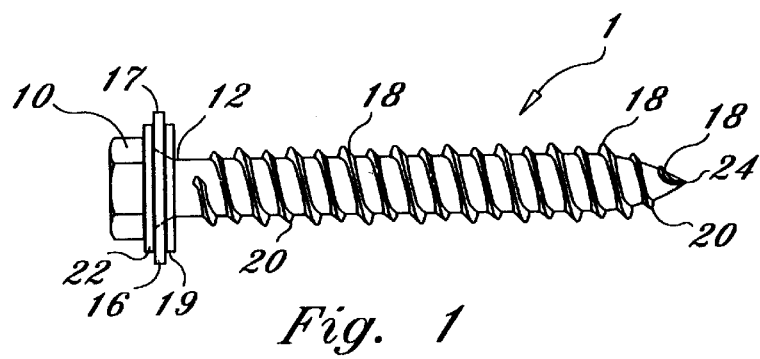
FIG. 1 is a side view of a self-tapping screw with improved cutting point in accordance with the present invention.
Figure 2:
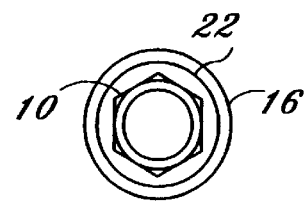
FIG. 2 is an end view of a hex head of a self-tapping screw with improved cutting point in accordance with the present invention.
Figure 3:
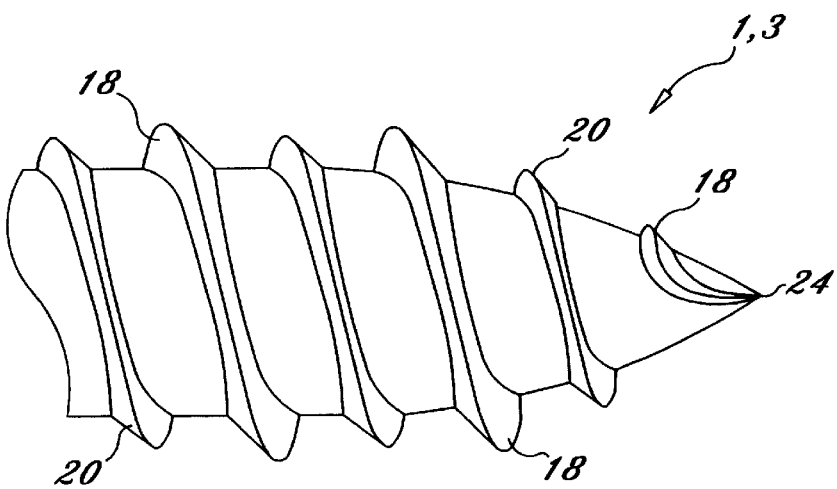
FIG. 3 is an enlarged side view of an end of a self-tapping screw with improved cutting point in accordance with the present invention.
Figure 4:
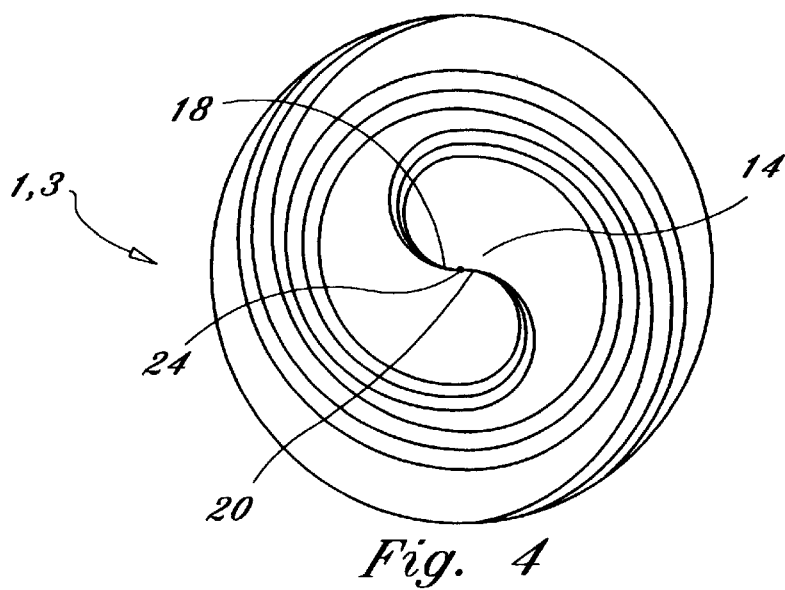
FIG. 4 is an end view of a point of a self-tapping screw with improved cutting point in accordance with the present invention.

With reference now to the drawings, and particularly to FIG. 1, there is shown a side view of a self-tapping screw with improved cutting point 1. With reference to FIGS. 2–4, the self-tapping screw 1 with double cutting point 1 includes a head 10, a screw body 12 a double cutting point 14, and a washer 16. A first thread 18 and a second thread 20 are formed on the screw body 12. The first thread 18 starts at substantially a shoulder 22 of the self-tapping screw 1. The second thread 20 has the same pitch as the first thread 18 and is disposed between the first thread. The major diameter of the second thread 20 is less than the major diameter of the first thread 18. The first thread 18 continues to a tip 24 of the screw body 12 and turns to become substantially parallel to the length of the screw body 12 at substantially the tip 24. The second thread 20 continues to the tip 24 of the screw body 12 and turns to become substantially parallel to the length of the screw body 12 at substantially the tip 24. The first thread 18 is substantially 180 degrees out-of-phase with the second thread 20 at the tip 24. Two flutes on the self-tapping screw allow sheet metal to be drilled through faster than a single flute. The head 10 is preferably a hex head with a shoulder 22 which is larger than the distance across the corners of the hex head. A washer 16, preferably metal with rubber vulcanized thereon is placed under the shoulder 22 of the head 10. The washer 16 includes a metal portion 17 and a rubber portion 19. The rubber portion 19 need not be vulcanized to the metal portion 17, but could be unattached.

The smaller major diameter of the second thread 20 has at least two advantages. First, the lower height of the second thread 20 allows the self-tapping screw with improved cutting point 1 to be threaded into a material with less force.

The high-low thread design is very important for a user with a battery power screw driver. Less energy is consumed from the battery pack when screwing a self-tapping screw with the high-low thread design. Second, the lower height of the second thread 20 provides greater pull out strength than that of an even height screw. The material is stronger because the screw intrusion of the second thread is reduced.

The following dimensions are given by way of example and not by way of limitation. For a #10 screw, preferably the nominal minor diameter is 0.122 inches; the first thread nominal major diameter is 0.203 inches; and the second thread nominal major diameter is 0.162 inches.

Figure 1A:
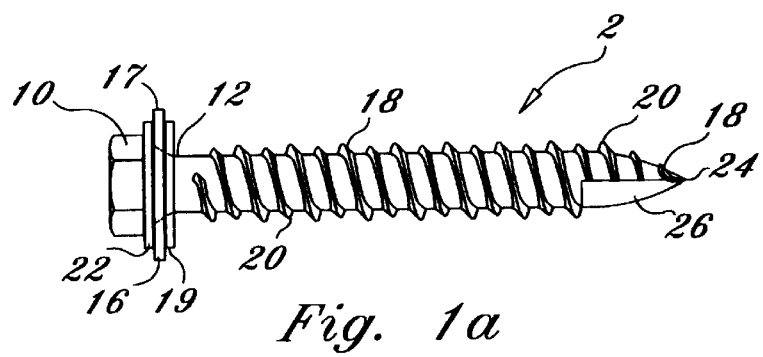
FIG. 1a is a side view of a self-tapping screw with improved cutting point having a notch in accordance with the present invention.
Figure 4A:
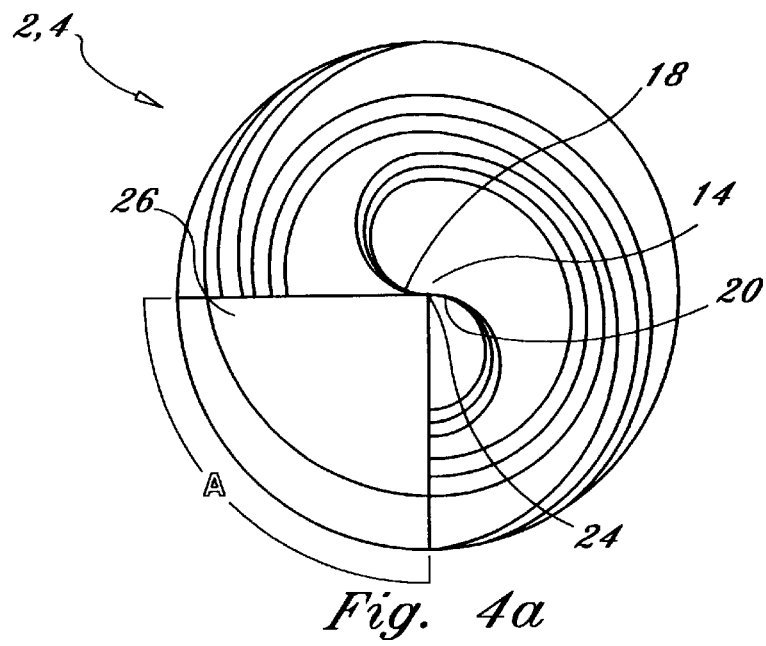
FIG. 4a is an end view of a point of a self-tapping screw with improved cutting point having a notch in accordance with the present invention.

With reference to figures 1a and 4a, a self-tapping screw with improved cutting point and notch 2 is formed when a notch 26 is formed at substantially the tip 24 of the self-tapping screw with improved cutting point 2. The notch 26 improves the drilling and deburring ability of the self-tapping screw with improved cutting point 2. The notch 26 preferably has an included angle A of substantially 90 degrees. The notch 26 is formed at substantially the tip 24 of the screw body 12. The notch 26 increases the diameter of the initial hole by cutting the edge of the initial hole. The notch 26 also helps to deburr the edge of the initial hole. Inclusion of the notch 26 has one major drawback, the notch 26 destroys a portion of either the first or second thread at the tip 24. A cutting edge of either the first or second thread still continues to the tip 24 even with inclusion of the notch 26. With out the notch 26, the self-tapping screw will have two cutting flutes which continue to the tip 24.

Figure 1B:
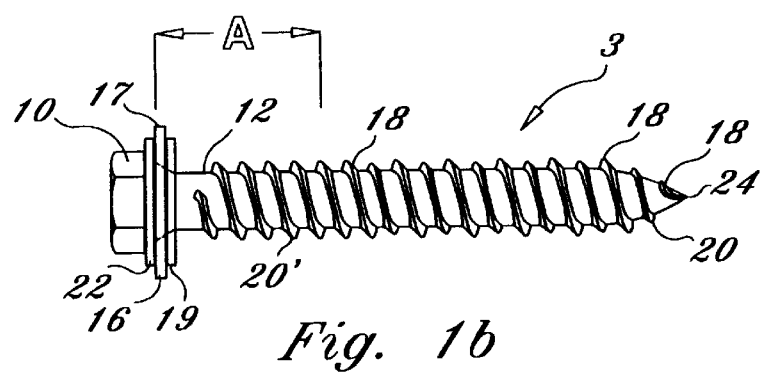
FIG. 1b is a side view of a self-tapping screw with improved thread design and an improved cutting point in accordance with the present invention.

FIG. 1b shows a self-tapping screw with improved thread design and cutting point 3. The major diameter of the second thread 20 is increased to equal the major diameter of the first thread 18 at a distance A from the shoulder 22 or bottom of the head 10. The following dimension is given by way of example and not by way of limitation. The dimension "A" is preferably ⅜ of an inch regardless of self-tapping screw size. The length of ⅜ of an inch is equivalent to approximately six first and second threads. The number of threads could be as great as six or as few as two.

Figure 8A:
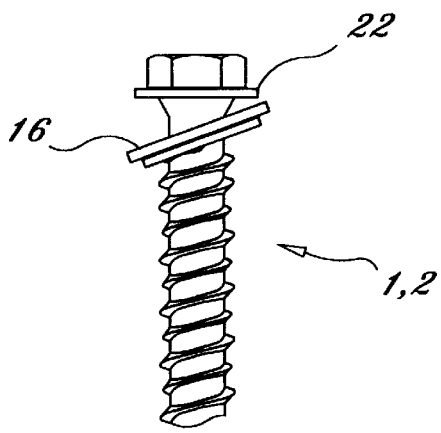
FIG. 8a is a side view of a washer assembled to a self-tapping screw having two sets of threads with different major diameters in accordance with the present invention.
Figure 8B:
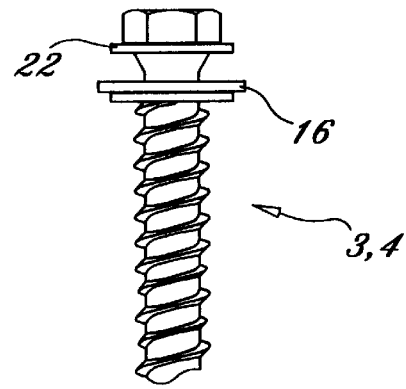
FIG. 8b is a side view of a washer assembled to a self-tapping screw having two sets of threads with different major diameters and with a smaller diameter thread increased to the same diameter as a larger diameter thread near the head thereof in accordance with the present invention.

With reference to FIGS. 8a and 8b, the increase in the major diameter of the second thread facilitates the automated application of the washer 16 to the self-tapping screw 3 such that the washer 16 is parallel to the shoulder 22 as shown in FIG. 8b. Without the diameter of the second thread 20 being increased to that of the first thread 18, near the shoulder 22, the washer 16 will be non-parallel to the shoulder 22 as shown in FIG. 8a. The washer 16 must be parallel to the shoulder 22 to facilitate automated painting thereof. The self-tapping screw with improved thread design and cutting point 3 is exactly the same as self-tapping screw 1 with the exception of the second thread 20'.

Figure 1C:
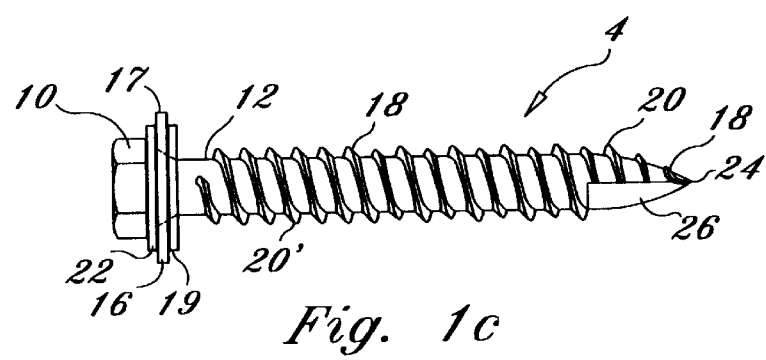
FIG. 1c is a side view of a self-tapping screw with improved thread design and a cutting point having a notch in accordance with the present invention.
Figure 1D:
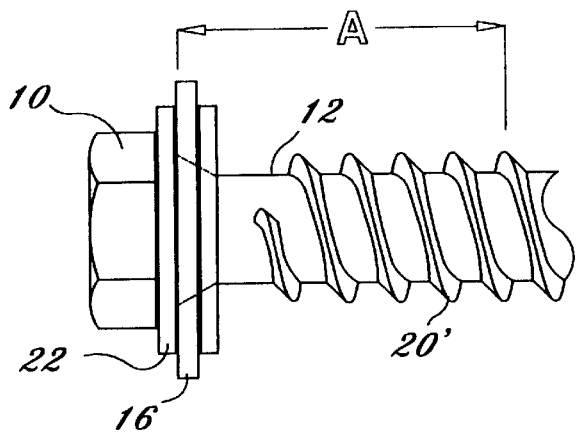
FIG. 1d is an enlarged side view of an area near the head of a self-tapping screw with improved thread design in accordance with the present invention.

FIG. 1c shows a self-tapping screw with improved thread design, cutting point and notch 4. The major diameter of the second thread 20 is increased to equal the major diameter of the first thread 18 at a distance A from the shoulder 22 or bottom of the head 10. The following dimension is given by way of example and not by way of limitation. The dimension "A" is preferably ⅜ of an inch regardless of self-tapping screw size. The length of ⅜ of an inch is equivalent to approximately six first and second threads. The number of threads could be as great as six or as few as two.

Figure 6:
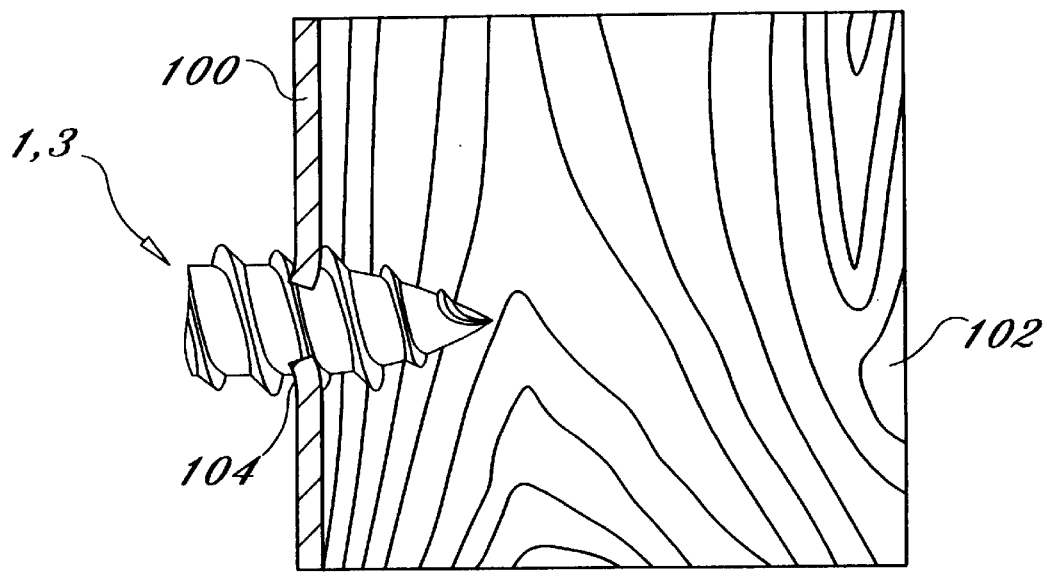
FIG. 6 is a cross sectional view of a self-tapping screw with improved cutting point after forming a hole in steel sheet and threading into a wood material in accordance with the present invention.

With reference to FIGS. 8a and 8b, the increase in the major diameter of the second thread 20 facilitates the automated application of the washer 16 to the self-tapping screw 3 or 4 such that the washer 16 is parallel to the shoulder 22 as shown in FIG. 8b. Without the diameter of the second thread 20 being increased to that of the first thread 18, near the shoulder 22, the washer 16 will be non-parallel to the shoulder 22 as shown in FIG. 8a. The washer 16 must be parallel to the shoulder 22 to facilitate automated painting thereof. The self-tapping screw with improved thread design and cutting point 3 or 4 is exactly the same as self-tapping screw 1 or 2 with the exception of the second thread 20'. FIG. 6 shows an enlarged view of the area adjacent the head 10 for self-tapping screws 3 & 4.

Figure 5:
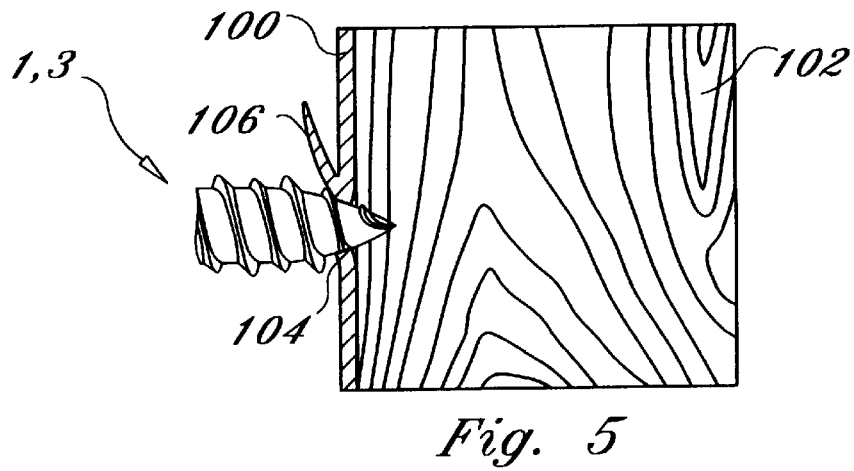
FIG. 5 is a cross sectional view of a self-tapping screw with improved cutting point drilling through steel sheet in accordance with the present invention.
Figure 7:
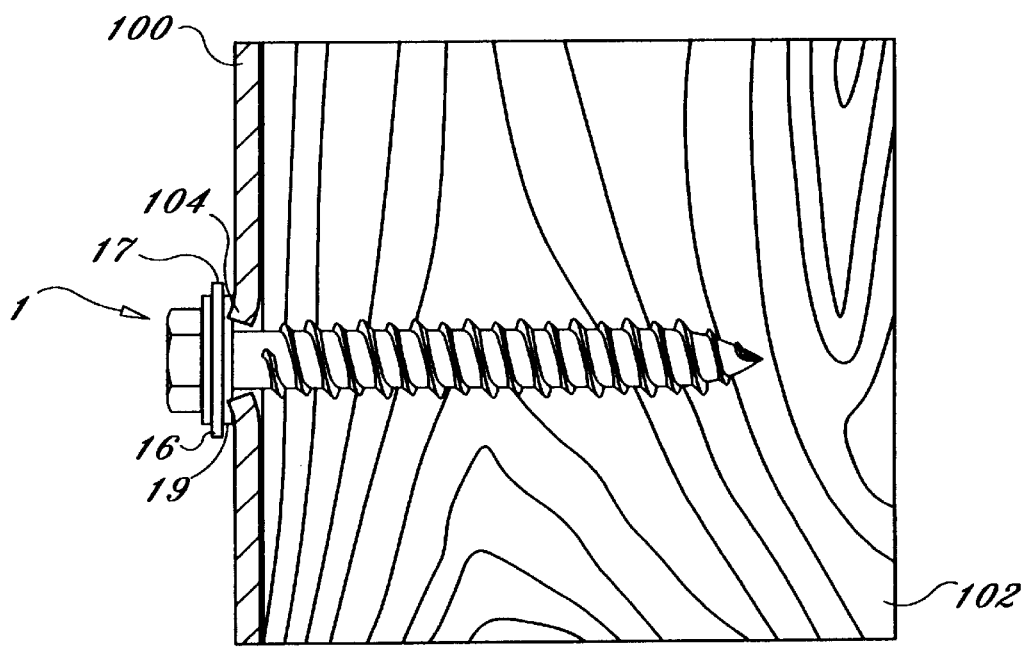
FIG. 7 is a cross sectional view of a self-tapping screw with improved cutting point retaining a piece of steel sheet against a wood frame in accordance with the present invention.

FIG. 5 shows the self-tapping screw 1 or 3 drilling through a steel sheet 100 and threading into a piece of wood 102. The drilling of the steel sheet 100 by the self-tapping screw 1 or 3 produces a hole with a small outward facing burr 104 and a string burr 106. FIG. 6 shows the self-tapping screw 1 or 3 further threaded through the sheet of steel 100 and into the piece of wood 102. The outward facing burr 104 is reduced slightly by the cutting action of the first and second threads. The string burr 106 has been cut-off by the threads of the self-tapping screw 1 or 3. Sometimes the string burr 106 is not cut-off by the threads of the self-tapping screw 1 or 3. If the self-tapping screw 2 or 4 were used, the outward facing burr 104 would be smaller and the string burr 106 would always be cut-off. FIG. 7 shows a self-tapping screw with improved cutting point 1 which retains the steel sheet 100 and the piece of wood 102. The washer 16 seals the hole created by the self-tapping screw with improved cutting point 1 from water leaks.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A self-tapping screw with improved thread design comprising:

a head;

a screw body extending from said head, said screw body forming a point at an end opposite said head;

a first thread being formed around said screw body from substantially said head to a tip; and a second thread having substantially the same pitch as said first thread, said second thread being formed between said first thread, said second thread having a major diameter which is less than the major diameter of said first thread for substantially the length of the first thread, the major diameter of said second thread equalling the major diameter of the first thread near said head.

2. The self-tapping screw with improved thread design of claim 1, wherein:

said first thread turning to become substantially parallel to a length of said screw body at substantially said tip, said second thread turning to become substantially parallel to the length of said screw body at substantially said tip.

3. The self-tapping screw with improved thread design of claim 1, wherein:

a notch being formed at said tip of said screw body, said notch improving the deburring and drilling ability of said self-tapping screw.

4. The self-tapping screw with improved thread design of claim 1, further comprising:

said head being a hex head.

5. The self-tapping screw with improved thread design of claim 1, further comprising:

a shoulder being formed on a bottom of said head.

6. The self-tapping screw with improved thread design of claim 5, further comprising:

a washer being placed over said screw body such that it contacts said shoulder, said washer sealing a hole created by said self-tapping screw.

7. The self-tapping screw with improved thread design of claim 6, wherein:

said washer having a metal portion and a rubber portion.

8. A self-tapping screw with improved thread design comprising:

a head;

a screw body extending from said head, said screw body forming a point at an end opposite said head;

a first thread being formed around said screw body from substantially said head to a tip, said first thread turning to become substantially parallel to a length of said screw body at substantially said tip; and a second thread having the same pitch as said first thread, said second thread being formed between said first thread, said second thread turning to become substantially parallel to the length of said screw body at substantially said tip, said second thread having a major diameter which is less than the major diameter of said first thread for substantially the length of the first thread, the major diameter of said second thread equalling the major diameter of the first thread for at least one thread from said head.

9. The self-tapping screw with improved thread design of claim 8, wherein:

a notch being formed at said tip of said screw body, said notch improving the deburring and drilling ability of said self-tapping screw.

10. The self-tapping screw with improved thread design of claim 8, further comprising:

said head being a hex head.

11. The self-tapping screw with improved thread design of claim 8, further comprising:

a shoulder being formed on a bottom of said head.

12. The self-tapping screw with improved thread design of claim 11, further comprising:

a washer being placed over said screw body such that it contacts said shoulder, said washer sealing a hole created by said self-tapping screw.

13. The self-tapping screw with improved thread design of claim 12, wherein:

said washer having a metal portion and a rubber portion.

14. A self-tapping screw with improved thread design comprising:

a head;

a screw body extending from said head, said screw body forming a point at an end opposite said head;

a first thread being formed around said screw body from substantially said head to a tip, said first thread turning to become substantially parallel to a length of said screw body at substantially said tip;

a second thread having the same pitch as said first thread, said second thread being formed between said first thread, said second thread turning to become substantially parallel to the length of said screw body at substantially said tip, said second thread having a major diameter which is less than the major diameter of said first thread, the major diameter of said second thread equalling the major diameter of the first thread for at least one thread from said head; and a notch being formed at said tip of said screw body, said notch improving the deburring and drilling ability of said self-tapping screw.

15. The self-tapping screw with improved thread design of claim 14, further comprising:

said head being a hex head.

16. The self-tapping screw with improved thread design of claim 14, further comprising:

a shoulder being formed on a bottom of said head.

17. The self-tapping screw with improved thread design of claim 16, further comprising:

a washer being placed over said screw body such that it contacts said shoulder, said washer sealing a hole created by said self-tapping screw.

18. The self-tapping screw with improved thread design of claim 17, wherein:

said washer having a metal portion and rubber portion.

* * * * *